United States Patent
Sasaki et al.

(10) Patent No.: US 12,139,591 B2
(45) Date of Patent: Nov. 12, 2024

(54) GLASS FIBER-REINFORCED RESIN MOLDED ARTICLE

(71) Applicant: NITTO BOSEKI CO., LTD., Fukushima (JP)

(72) Inventors: Ryo Sasaki, Fukushima (JP); Yosuke Nukui, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 18/014,223

(22) PCT Filed: Mar. 28, 2022

(86) PCT No.: PCT/JP2022/014809
§ 371 (c)(1),
(2) Date: Jan. 3, 2023

(87) PCT Pub. No.: WO2022/254914
PCT Pub. Date: Dec. 8, 2022

(65) Prior Publication Data
US 2023/0192991 A1    Jun. 22, 2023

(30) Foreign Application Priority Data

May 31, 2021    (JP) .................................. 2021-090952

(51) Int. Cl.
*C08K 7/14*    (2006.01)
*C08L 71/10*    (2006.01)

(52) U.S. Cl.
CPC .................. *C08K 7/14* (2013.01); *C08L 71/10* (2013.01)

(58) Field of Classification Search
CPC ...................................................... C08K 7/14
See application file for complete search history.

(56) References Cited

U.S. PATENT DOCUMENTS 11,091,596 B2    8/2021 Nukui et al.

FOREIGN PATENT DOCUMENTS

| EP | 3892596 A1 | * | 10/2021 | ............. C03C 13/00 |
| EP | 4 029 840 A1 | | 7/2022 | |
| JP | 2010-222486 A | | 10/2010 | |
| JP | 2014-040555 A | | 3/2014 | |
| JP | 2015-105359 A | | 6/2015 | |
| JP | 2019-052323 A | | 4/2019 | |
| JP | 2019081909 A | * | 5/2019 | ............. C03C 13/00 |
| JP | 2019-209509 A | | 12/2019 | |
| WO | 2021/049581 A1 | | 3/2021 | |

* cited by examiner

*Primary Examiner* — Jane L Stanley
(74) *Attorney, Agent, or Firm* — Carrier, Shende & Associates P.C.; Joseph P. Carrier; Jeffrey T. Gedeon

(57) ABSTRACT

In the glass fiber-reinforced resin molded article, the glass fiber has a flat cross-sectional shape having a ratio of the major axis to the minor axis (major axis/minor axis) in the range of 5.0 to 10.0, the thermoplastic resin is polyaryletherketone, the number average fiber length L of the glass fiber having a length of 25 μm or more contained in the glass fiber-reinforced resin molded article is in the range of 50 to 300 μm, the proportion $P_S$ of the glass fiber having a length of 25 to 100 μm contained in the glass fiber-reinforced resin molded article is in the range of 20.0 to 60.0%, the proportion $P_L$ of the glass fiber having a length of 500 μm or more is in the range of 1.0 to 15.0%; and the L, $P_S$, $P_L$ satisfy the following formula (1).

$$39.5 \leq L \times P_S^2/(1000 \times P_L) \leq 82.4 \qquad (1)$$

3 Claims, No Drawings

GLASS FIBER-REINFORCED RESIN MOLDED ARTICLE

TECHNICAL FIELD

The present invention relates to a glass fiber-reinforced resin molded article.

BACKGROUND ART

Glass fiber-reinforced resin molded articles that comprise flat cross-sectional glass fiber having a flat cross-sectional shape have been conventionally known (see e.g., Patent Literatures 1 and 2).

Glass fiber-reinforced resin molded articles comprising flat cross-sectional glass fiber are used in light, thin, short, and small parts such as portable electronic device cases, since having suppressed occurrence of warpage and excellent dimensional stability, and further having mechanical properties, surface smoothness, and the like as compared with glass fiber-reinforced resin molded articles comprising circular cross-sectional glass fiber having a circular cross-sectional shape. Thus, as described in Patent Literatures 1 and 2 mentioned above, in order to enhance mechanical properties in the glass fiber-reinforced resin molded article comprising flat cross-sectional glass fiber, attempts are being made to increase the length of fiber of the flat cross-sectional glass fiber contained in the glass fiber-reinforced resin molded article.

CITATION LIST

Patent Literature

Patent Literature 1: Japanese Patent Laid-Open No. 2015-105359
Patent Literature 2: Japanese Patent Laid-Open No. 2010-222486

SUMMARY OF INVENTION

Technical Problem

In recent years, along with further miniaturization of electronic devices, further high dimensional accuracy is required for glass fiber-reinforced resin molded articles used as parts thereof.

However, in order to achieve the high dimensional accuracy, conventional glass fiber-reinforced resin molded articles comprising flat cross-sectional glass fiber have a disadvantage that the anisotropy of the shrinkage factor that is represented by the ratio of the molded article shrinkage factor in the MD direction (hereinafter, referred to as the MD direction shrinkage factor) to the molded article shrinkage factor in the TD direction (hereinafter, referred to as the TD direction shrinkage factor) is large.

Here, the TD direction refers to a direction orthogonally intersects the flow direction of a resin composition when a resin composition comprising glass fiber is molded to produce a glass fiber-reinforced resin molded article. The MD direction refers to the flow direction of a resin composition when a resin composition comprising glass fiber is molded to produce a glass fiber-reinforced resin molded article.

The present inventors have intensively studied the reason for the large anisotropy of the shrinkage factor in conventional glass fiber-reinforced resin molded articles comprising flat cross-sectional glass fiber. As a result, the present inventors have found that, contrary to conventional attempts, shifting the distribution of the length of the glass fiber in the glass fiber-reinforced resin molded article to a shorter direction allows the anisotropy of the shrinkage factor to be reduced and also allows the TD direction shrinkage factor to be reduced, and a patent application is separately filed regarding this finding.

Meanwhile, the present inventors have found that in the case where shifting the distribution of the length of the glass fiber in a glass fiber-reinforced resin molded article to a shorter direction allows the anisotropy of the shrinkage factor to be reduced, the effect of reducing the occurrence of warpage is not constant.

Therefore, an object of the present invention is to provide a glass fiber-reinforced resin molded article having reduced anisotropy of the shrinkage factor and significantly reduced occurrence of warpage.

Solution to Problem

The present inventors have found that shifting the distribution of the length of the glass fiber in a glass fiber-reinforced resin molded article to a shorter direction and reducing the proportion of glass fiber having a high length in the distribution of the length of the glass fiber in a glass fiber-reinforced resin molded article using specific flat cross-sectional glass fiber and a specific resin allow the anisotropy of the shrinkage factor to be reduced and the occurrence of warpage to be significantly reduced, thereby completing the present invention.

That is, the glass fiber-reinforced resin molded article of the present invention is a glass fiber-reinforced resin molded article comprising glass fiber in the range of 10.0 to 50.0% by mass and a thermoplastic resin in the range of 90.0 to 50.0% by mass with respect to the total amount of the glass fiber-reinforced resin molded article, wherein the glass fiber has a flat cross-sectional shape having a ratio of the major axis to the minor axis (major axis/minor axis) in the range of 5.0 to 10.0; the thermoplastic resin is polyaryletherketone; the number average fiber length L (μm) of the glass fiber having a length of 25 μm or more contained in the glass fiber-reinforced resin molded article is in the range of 50 to 300 μm; the proportion $P_S$ (%) of the glass fiber having a length in the range of 25 to 100 μm with respect to the total number of the glass fiber having a length of 25 μm or more contained in the glass fiber-reinforced resin molded article is in the range of 20.0 to 60.0%; the proportion $P_L$ (%) of the glass fiber having a length of 500 μm or more with respect to the total number of the glass fiber having a length of 25 μm or more contained in the glass fiber-reinforced resin molded article is in the range of 1.0 to 15.0%; and the L (μm), $P_S$ (%), and $P_L$ (%) satisfy the following formula (1).

$$39.5 \leq L \times P_S^2 / (1000 \times P_L) \leq 82.4 \qquad (1)$$

According to the glass fiber-reinforced resin molded article of the present invention, comprising the glass fiber and the thermoplastic resin in the above range, the L, $P_S$, and $P_L$ being in the above range, and satisfying the formula (1) allow the anisotropy of the shrinkage factor to be reduced and the occurrence of warpage to be significantly reduced.

The glass fiber-reinforced resin molded article of the present invention can be obtained by, for example, kneading the glass fiber and the thermoplastic resin by a twin-screw kneader, and conducting injection molding using the obtained resin pellets. When the glass fiber-reinforced resin molded article of the present invention is obtained by injection molding, the glass fiber-reinforced resin molded article of the present invention may be represented as the glass fiber-reinforced resin injection-molded article.

Here, the MD direction shrinkage factor and the TD direction shrinkage factor can be calculated as follows. Injection molding is performed using a glass fiber-reinforced resin composition constituting the glass fiber-reinforced resin molded article and a mold having an internal dimension of the cavity of 80 mm in length×60 mm in width×2.0 mm in depth to obtain a flat plate. In this case, the MD direction shrinkage factor is a numerical value obtained by measuring the dimension of the flat plate in the length direction (actual dimension in the length direction; unit=mm) by a caliper and being calculated by ((80−actual dimension in the length direction)/80)×100. The TD direction shrinkage factor is a numerical value obtained by measuring the dimension of the flat plate in the width direction (actual dimension in the width direction; unit=mm) by a caliper and being calculated by ((60−actual dimension in the width direction)/60)×100.

Then, "allow the anisotropy of the shrinkage factor to be reduced" means that, when a flat plate-like glass fiber-reinforced resin molded article having a thickness of 2.0 mm is produced as described above, the ratio of the MD direction shrinkage factor to the TD direction shrinkage factor (hereinafter, referred to as the shrinkage ratio) to the shrinkage ratio of a glass fiber-reinforced resin molded article produced under the entirely same conditions, except that glass fiber having a flat cross-sectional shape in which the minor axis is 7.0 μm, the major axis is 28.0 μm, and the major axis/minor axis is 4.0 is used as the glass fiber, the content of the glass fiber with respect to the total amount of the glass fiber-reinforced resin molded article is 30.0% by mass, and the screw rotation speed during kneading of the glass fiber and the thermoplastic resin is 100 rpm (hereinafter, referred to as the reference shrinkage ratio), (shrinkage ratio/reference shrinkage ratio) is 1.05 or more.

Moreover, "allow . . . the occurrence of warpage to be significantly reduced" means that, when a flat plate-like glass fiber-reinforced resin molded article having a thickness of 1.5 mm is produced, the ratio of the measured value of warpage (warpage amount) to the measured value of warpage of a glass fiber-reinforced resin molded article produced under the entirely same conditions, except that glass fiber having a flat cross-sectional shape in which the minor axis is 7.0 μm, the major axis is 28.0 μm, and the major axis/minor axis is 4.0 is used as the glass fiber, the content of the glass fiber with respect to the total amount of the glass fiber-reinforced resin molded article is 30.0% by mass, and the screw rotation speed during kneading of the glass fiber and the thermoplastic resin is 100 rpm (reference warpage amount), (warpage amount/reference warpage amount) is 0.50 or less.

Here, the warpage amount is a value calculated as follows by using a flat plate obtained by performing injection molding using a glass fiber-reinforced resin composition constituting the glass fiber-reinforced resin molded article and a mold having an internal dimension of the cavity of 100 mm×100 mm×1.5 mm. First, when a corner of the flat plate is grounded on a flat surface, the distance between a corner at the diagonal position of the corner that is grounded on the flat surface and the flat surface is measured by a caliper. Then, the distance is measured for the cases where each of four corners of the flat plate is grounded on the flat surface, and the warpage amount is calculated as the average value of these distances.

In the glass fiber-reinforced resin molded article of the present invention, it is preferable that the L (μm) be in the range of 75 to 250 μm, the $P_S$ (%) be in the range of 30.0 to 50.0%, the $P_L$ (%) be in the range of 2.0 to 6.0%, and the L, $P_S$, and $P_L$ satisfy the following formula (2).

$$55.9 \leq L \times P_S^2/(1000 \times P_L) \leq 81.9 \qquad (2)$$

According to the glass fiber-reinforced resin molded article of the present invention, the L, $P_S$, and $P_L$ being in the range and satisfying the formula (2) allow the anisotropy of the shrinkage factor to be further reduced and the occurrence of warpage to be significantly reduced.

Here, "allow the anisotropy of the shrinkage factor to be further reduced" means that, when a flat plate-like glass fiber-reinforced resin molded article having a thickness of 2.0 mm is produced, the shrinkage ratio/reference shrinkage ratio is 1.15 or more.

Moreover, "allow . . . the occurrence of warpage to be significantly reduced" means that, when a flat plate-like glass fiber-reinforced resin molded article having a thickness of 1.5 mm is produced, the warpage amount/reference warpage amount is 0.40 or less.

In the glass fiber-reinforced resin molded article of the present invention, it is preferable that the L (μm) be in the range of 80 to 190 μm, the $P_S$ (%) be in the range of 35.0 to 50.0%, the $P_L$ (%) be in the range of 2.0 to 5.0%, and the L, $P_S$, and $P_L$ satisfy the following formula (3).

$$71.1 \leq L \times P_S^2/(1000 \times P_L) \leq 80.1 \qquad (3)$$

According to the glass fiber-reinforced resin molded article of the present invention, the L, $P_S$, and $P_L$ being in the range and satisfying the formula (3) allow the anisotropy of the shrinkage factor to be further reduced and the occurrence of warpage to be most reduced.

Here, "allow the anisotropy of the shrinkage factor to be further reduced" means that, when a flat plate-like glass fiber-reinforced resin molded article having a thickness of 2.0 mm is produced, the shrinkage ratio/reference shrinkage ratio is 1.20 or more.

Moreover, "allow . . . the occurrence of warpage to be most reduced" means that, when a flat plate-like glass fiber-reinforced resin molded article having a thickness of 1.5 mm is produced, the warpage amount/reference warpage amount is 0.30 or less.

DESCRIPTION OF EMBODIMENTS

Hereinafter, embodiments of the present invention will be described in detail.

The glass fiber-reinforced resin molded article of the present embodiment is a glass fiber-reinforced resin molded article comprising glass fiber in the range of 10.0 to 50.0% by mass and a thermoplastic resin in the range of 90.0 to 50.0% by mass with respect to the total amount of the glass fiber-reinforced resin molded article, wherein the glass fiber has a flat cross-sectional shape having a ratio of the major axis to the minor axis (major axis/minor axis) in the range of 5.0 to 10.0; the thermoplastic resin is polyaryletherketone; the number average fiber length L (μm) of the glass fiber having a length of 25 μm or more contained in the glass fiber-reinforced resin molded article is in the range of 50 to 300 μm; the proportion $P_S$ (%) of the glass fiber having a length in the range of 25 to 100 μm with respect to the total number of the glass fiber having a length of 25 μm or more contained in the glass fiber-reinforced resin molded article is in the range of 20.0 to 60.0%; the proportion $P_L$ (%) of the glass fiber having a length of 500 μm or more with respect to the total number of the glass fiber having a length of 25 μm or more contained in the glass fiber-reinforced resin molded article is in the range of 1.0 to 15.0%; and the L (μm), $P_S$ (%), and $P_L$ (%) satisfy the following formula (1).

$$39.5 \leq L \times P_S^2/(1000 \times P_L) \leq 82.4 \quad (1)$$

Here, when the $P_S$ is too small, the reduction of the anisotropy of the shrinkage factor tends to be insufficient. On the other hand, when the $P_S$ is too large, the warpage amount tends to be not sufficiently reduced. On the other hand, when the ratio of $P_L$ to L, ($P_L$/L) is too large, the warpage amount tends to be not sufficiently reduced although the anisotropy of the shrinkage factor is reduced. The formula (1) seems to reflect these tendencies and represent the balance between the reduction of the anisotropy of the shrinkage factor and the reduction of the warpage amount.

The glass fiber-reinforced resin molded article of the present embodiment can be obtained by, for example, kneading the glass fiber and the thermoplastic resin by a twin-screw kneader, and conducting injection molding using the obtained resin pellets. The glass fiber-reinforced resin molded article of the present embodiment can be obtained by a known molding method such as injection compression molding method, two-color molding method, hollow molding method, foam molding method including that using supercritical fluid, insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

In the glass fiber-reinforced resin molded article of the present embodiment, the major axis of the glass fiber is, for example, in the range of 29.0 to 55.0 μm, and from the viewpoint of increasing the fluidity of the kneaded material of the glass fiber and the thermoplastic resin during production of the glass fiber-reinforced resin molded article, it is preferably in the range of 29.5 to 45.0 μm, more preferably in the range of 30.0 to 39.0 μm, further preferably in the range of 30.5 to 37.0 μm, and particularly preferably in the range of 31.0 to 35.0 μm.

In the glass fiber-reinforced resin molded article of the present embodiment, the minor axis of the glass fiber is, for example, in the range of 3.0 to 18.0 μm, preferably in the range of 3.5 to 9.5 μm, more preferably in the range of 3.7 to 8.0 μm, further preferably in the range of 4.0 to 7.4 μm, particularly preferably in the range of 4.5 to 7.0 μm, and most preferably in the range of 5.0 to 6.4 μm.

In the glass fiber-reinforced resin molded article of the present embodiment, the major axis and minor axis of the glass fiber can be, for example, calculated as follows. First, a cross section of a glass fiber-reinforced resin molded article is polished, then, the length of the major axis and the minor axis of 100 or more glass filaments having a flat cross-sectional shape is measured using an electron microscope, the major axis being the longest side that passes through the substantial center of the glass filament cross section, the minor axis being the side that orthogonally intersects the major axis at the substantial center of the glass filament cross section, and the average values thereof is determined, thereby calculating the major axis and the minor axis.

In the flat cross-sectional glass fiber used in the glass fiber-reinforced resin molded article of the present embodiment, the ratio of the major axis to the minor axis (major axis/minor axis) is in the range of 5.0 to 10.0, preferably in the range of 5.0 to 8.0, more preferably in the range of 5.5 to 7.5, further preferably in the range of 5.6 to 7.0, and particularly preferably in the range of 5.7 to 6.6.

In the glass fiber-reinforced resin molded article of the present embodiment, the flat cross-sectional shape of the glass fiber is, for example, a rectangular shape, an elliptical shape, or a long-oval shape, preferably a long-oval shape. Here, the cross-sectional shape is the shape of a cross section that is cut by a plane orthogonally intersecting the length direction of the glass fiber, and the long-oval shape is a shape having a semicircular shape at both ends of a rectangle, or a shape similar thereto.

In the glass fiber-reinforced resin molded article of the present embodiment, the glass composition of the glass fiber is not particularly limited. In the glass fiber-reinforced resin molded article of the present embodiment, examples of the glass composition that may be taken by the glass fiber include the most common E glass composition, a high strength and high modulus glass composition, a high modulus and easily-producible glass composition, and a low dielectric constant and low dielectric tangent glass composition. From the viewpoint of enhancing the strength of the glass fiber-reinforced resin molded article, the glass composition of the glass fiber is preferably the high strength and high modulus glass composition or the high modulus and easily-producible glass composition. From the viewpoint of lowering the dielectric constant and dielectric tangent of the glass fiber-reinforced resin molded article and reducing the transmission loss of high frequency signals that pass through the glass fiber-reinforced resin molded article, the glass composition of the glass fiber is preferably a low dielectric constant and low dielectric tangent glass composition.

The E glass composition is a composition including $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of the glass fiber.

The high strength and high modulus glass composition is a composition including $SiO_2$ in the range of 60.0 to 70.0% by mass, $Al_2O_3$ in the range of 20.0 to 30.0% by mass, MgO in the range of 5.0 to 15.0% by mass, $Fe_2O_3$ in the range of 0 to 1.5% by mass, and $Na_2O$, $K_2O$, and $Li_2O$ in the range of 0 to 0.2% by mass in total, with respect to the total amount of the glass fiber.

The high modulus and easily-producible glass composition is a composition including $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, and $B_2O_3$ in the range of 0.5 to 1.5% by mass, with respect to the total amount of the glass fiber, in which the total amount of $SiO_2$, $Al_2O_3$, MgO, and CaO is 98.0% by mass or more.

The low dielectric constant and low dielectric tangent glass composition is a composition including $SiO_2$ in the range of 48.0 to 62.0% by mass, $B_2O_3$ in the range of 17.0 to 26.0% by mass, $Al_2O_3$ in the range of 9.0 to 18.0% by mass, CaO in the range of 0.1 to 9.0% by mass, MgO in the range of 0 to 6.0% by mass, $Na_2O$, $K_2O$, and $Li_2O$ in the range of 0.05 to 0.5% by mass in total, $TiO_2$ in the range of 0 to 5.0% by mass, SrO in the range of 0 to 6.0% by mass, $F_2$ and $Cl_2$ in the range of 0 to 3.0% by mass in total, and $P_2O_5$ in the range of 0 to 6.0% by mass, with respect to the total amount of the glass fiber.

Regarding measurement of the content of each component of the above glass compositions, the content of Li as the light element can be measured with an ICP emission spectroscopic analyzer, and the contents of other elements can be measured with a wavelength dispersive X-ray fluorescence analyzer. The measurement method is as follows. First, the glass fiber is cut to an appropriate size, then placed in a platinum crucible and melted with stirring while being held at a temperature of 1550° C. for 6 hours in an electric furnace to obtain a homogeneous molten glass. Here, when organic matter adheres to the surface of the glass fiber during cutting, or when glass fiber is mainly included as a reinforcing material in organic matter (resin), the glass fiber is used after the organic matter is removed by, for example, heating for about 2 to 24 hours in a muffle furnace at 300 to 650° C. Next, the obtained molten glass is poured onto a carbon plate to produce a glass cullet, and then pulverized and powdered to obtain glass powder. Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. Specifically, the quantitative analysis using a wavelength dispersive X-ray fluorescence analyzer can be performed by producing a sample for calibration curve based on the results measured by the fundamental parameter method, and analyzing by the calibration curve method. The content of each component in the sample for calibration curve can be quantitatively analyzed by an ICP emission spectroscopic analyzer. These quantitative analysis results are converted in terms of oxides to calculate the content of each component and the total amount, and the above content (% by mass) of each component can be determined from these numerical values.

The glass fiber comprising the above glass composition is produced as follows. First, a glass raw material (glass batch) prepared to have the above composition is supplied to a melting furnace and melted at a temperature in the range of 1450 to 1550° C., for example. Then, the melted glass batch (melted glass) is drawn from 1 to 30000 nozzle tips of a bushing controlled at a predetermined temperature and rapidly cooled to form glass filaments. Subsequently, the glass filaments formed are applied with a sizing agent or binder using an applicator as an application apparatus. While 1 to 30000 of the glass filaments are bundled using a bundling shoe, the glass filaments are wound on a tube at a high speed using a winding apparatus to obtain glass fiber.

Here, allowing the nozzle tip to have a non-circular shape and to have a protrusion or a notch for rapidly cooling the molten glass and controlling the temperature conditions can provide the above glass fiber having a flat cross-sectional shape used in the glass fiber-reinforced resin molded article of the present embodiment. Adjusting the diameter of the nozzle tip, winding speed, temperature conditions, and the like can adjust the minor axis and major axis of the glass fiber. For example, accelerating the winding speed can make the minor axis and major axis smaller, and reducing the winding speed can make the minor axis and major axis larger.

The glass fiber is usually formed by a plurality of glass filaments bundled, but in the glass fiber-reinforced resin molded article, which is subjected to molding processing, the glass filaments are debundled and present dispersed in a glass filament state in the glass fiber-reinforced resin molded article.

Here, in the glass fiber-reinforced resin molded article of the present embodiment, examples of the preferred form of the glass fiber before molding processing include chopped strands, in which the number of glass filaments constituting the glass fiber (number bundled) is preferably in the range of 1 to 20000, more preferably in the range of 50 to 10000, and further preferably in the range of 1000 to 8000 and glass fiber (also referred to as a glass fiber bundle or glass strand) is preferably cut into a length in the range of 1.0 to 25.0 mm, further preferably in the range of 1.2 to 10.0 mm, particularly preferably in the range of 1.5 to 6.0 mm, and most preferably in the range of 2.5 to 3.5 mm. In addition, examples of the form of the glass fiber before molding processing in the glass fiber-reinforced resin molded article of the present embodiment include rovings, in which the number of glass filaments constituting the glass fiber is in the range of 10 to 30000 and which are obtained without cutting, and cut fiber, in which the number of glass filaments constituting the glass fiber is in the range of 1 to 20000 and which is obtained by pulverization so as to have a length in the range of 0.01 to 1.00 mm by a known method such as a ball mill or Henschel mixer, in addition to chopped strands.

In the glass fiber-reinforced resin molded article of the present embodiment, the glass fiber may be coated with an organic matter on the surface thereof, for the purposes such as improvement of adhesiveness between glass fiber and a resin, and improvement of uniform dispersibility of glass fiber in a mixture of glass fiber and a resin or inorganic material. Examples of such an organic matter can include resins such as urethane resins, epoxy resins, vinyl acetate resins, acrylic resins, modified polypropylene, particularly carboxylic acid-modified polypropylene, and a copolymer of (poly)carboxylic acid, particularly maleic acid and an unsaturated monomer, or a silane coupling agent.

In the glass fiber-reinforced resin molded article of the present embodiment, the glass fiber may be coated with the composition including a lubricant, a surfactant, and the like in addition to these resins or the silane coupling agent. Such a composition covers the glass fiber at a rate in the range of 0.1 to 2.0% by mass based on the mass of the glass fiber in a state where it is not coated with the composition.

The glass fiber can be coated with an organic matter by applying the sizing agent or the binder containing a solution of the resin, the silane coupling agent, or the composition to the glass fiber using a known method such as a roller applicator, for example, in the manufacturing process of the glass fiber, and then drying the glass fiber to which the solution of the resin, the silane coupling agent, or the composition is applied.

Here, examples of the silane coupling agent include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxy silane include γ-glycidoxypropyltrimethoxysilane and β-(3,4-epoxy cyclohexyl)ethyltrimethoxysilane.

Examples of the mercaptosilane include γ-mercaptotrimethoxysilane.

Examples of the vinyl silane include vinyl trimethoxysilane and N-β-(N-vinylbenzylaminoethyl)-γ-aminopropyltrimethoxysilane.

Examples of the acrylsilane include γ-methacryloxypropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid.

Examples of the quaternary ammonium salt include alkyltrimethylammonium salts such as lauryltrimethylammonium chloride.

Examples of the surfactant include nonionic surfactants, cationic surfactants, anionic surfactants, and amphoteric surfactants. As the surfactant, these compounds can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts such as higher alkylamine acetate and higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

In the glass fiber-reinforced resin molded article of the present embodiment, the content of the glass fiber with respect to the total amount of the glass fiber-reinforced resin molded article is in the range of 10.0 to 50.0% by mass, preferably in the range of 15.0 to 47.5% by mass, more preferably in the range of 25.0 to 45.0% by mass, and further preferably in the range of 30.0 to 40.0% by mass.

In the glass fiber-reinforced resin molded article of the present embodiment, the content of the glass fiber with respect to the total amount of the glass fiber-reinforced resin molded article can be calculated as follows. First, the mass of the glass fiber-reinforced resin molded article (mass before heating) is measured. Then, the glass fiber-reinforced resin molded article is heated in a muffle furnace under conditions of 625° C. in the range of 0.5 to 24 hours to incinerate resin components. Subsequently, the mass of the glass fiber remained after incineration of the resin components (mass after heating) is measured. The content of the glass fiber can be calculated based on the obtained mass before heating and mass after heating by (mass after heating/mass before heating)×100.

In the glass fiber-reinforced resin molded article of the present embodiment, examples of the polyaryletherketone can include polyetherketone (PEK), polyetheretherketone (PEEK), polyetherketoneketone (PEKK), and polyetheretherketoneketone (PEEKK), and in terms of particularly excellent heat resistance, polyetheretherketone (PEEK) is preferable.

In the glass fiber-reinforced resin molded article of the present embodiment, the content of the thermoplastic resin with respect to the total amount of the glass fiber-reinforced resin molded article is in the range of 90.0 to 50.0% by mass, preferably in the range of 85.0 to 52.5% by mass, more preferably in the range of 75.0 to 55.0% by mass, and further preferably in the range of 70.0 to 60.0% by mass.

In the glass fiber-reinforced resin molded article of the present embodiment, the content of the thermoplastic resin with respect to the total amount of the glass fiber-reinforced resin molded article can be calculated as follows. First, the mass of the glass fiber-reinforced resin molded article (mass before heating) is measured. Then, the glass fiber-reinforced resin molded article is heated in a muffle furnace under conditions of 625° C. in the range of 0.5 to 24 hours to incinerate resin components. Subsequently, the mass of the substances remained after incineration of the resin components (mass after heating) is measured. The content of the thermoplastic resin can be calculated based on the obtained mass before heating and mass after heating by ((mass before heating−mass after heating)/mass before heating)×100.

In the glass fiber-reinforced resin molded article of the present embodiment, the number average fiber length L of the glass fiber having a length of 25 μm or more contained in the glass fiber-reinforced resin molded article is in the range of 50 to 300 μm, preferably in the range of 75 to 250 μm, more preferably in the range of 80 to 190 μm, further preferably in the range of 85 to 160 μm, and particularly preferably in the range of 90 to 140 μm.

Here, when the glass fiber-reinforced resin molded article of the present embodiment is obtained by injection molding, the number average fiber length L of the glass fiber having a length of 25 µm or more can be controlled by adjusting, for example, the length of the chopped strands to be charged into a twin-screw kneader, or the screw rotation speed of the twin-screw kneader. For example, the number average fiber length L of the glass fiber can be made longer by making the length of the chopped strands to be charged into a twin-screw kneader longer in the range of 1.0 to 100.0 mm, and the number average fiber length L of the glass fiber can be made shorter by making the length of the chopped strands shorter in the range of 1.0 to 100.0 mm. The number average fiber length L of the glass fiber can be made longer by lowering the screw rotation speed during twin-screw kneading in the range of 10 to 1000 rpm, and the number average fiber length L of the glass fiber can be made shorter by elevating the number of revolution in the range of 10 to 1000 rpm.

The number average fiber length L of the glass fiber having a length of 25 µm or more contained in the glass fiber-reinforced resin molded article of the present embodiment can be calculated by the method described in Examples described below.

In the glass fiber-reinforced resin molded article of the present embodiment, the proportion $P_S$ of the glass fiber having a length in the range of 25 to 100 µm with respect to the total number of the glass fiber having a length of 25 µm or more contained in the glass fiber-reinforced resin molded article is in the range of 20.0 to 60.0%, preferably in the range of 30.0 to 50.0%, more preferably in the range of 35.0 to 50.0%, further preferably in the range of 37.0 to 47.0%, particularly preferably in the range of 40.0 to 46.0%, and most preferably in the range of 42.0 to 45.0%. The $P_S$ can be determined by the method described in Examples described below.

In the glass fiber-reinforced resin molded article of the present embodiment, the proportion $P_L$ of the glass fiber having a length of 500 µm or more with respect to the total number of the glass fiber having a length of 25 µm or more contained in the glass fiber-reinforced resin molded article is in the range of 1.0 to 15.0%, preferably in the range of 2.0 to 6.0%, more preferably in the range of 2.0 to 5.0%, further preferably in the range of 2.1 to 4.0%, particularly preferably in the range of 2.2 to 3.0%, and most preferably in the range of 2.3 to 2.7%. The $P_L$ can be determined by the method described in Examples described below.

In the glass fiber-reinforced resin molded article of the present embodiment, it is preferable that the L (µm) be in the range of 75 to 250 µm, the $P_S$ (%) be in the range of 30.0 to 50.0%, the $P_L$ (%) be in the range of 2.0 to 6.0%, and the L, $P_S$, and $P_L$ satisfy the following formula (2).

$$55.9 \leq L \times P_S^2/(1000 \times P_L) \leq 81.9 \quad (2)$$

In the glass fiber-reinforced resin molded article of the present embodiment, it is more preferable that the L (µm) be in the range of 80 to 190 µm, the $P_S$ (%) be in the range of 30.0 to 50.0%, the $P_L$ (%) be in the range of 2.0 to 6.0%, and the L, $P_S$, and $P_L$ satisfy the formula (2).

In the glass fiber-reinforced resin molded article of the present embodiment, it is further preferable that the L (µm) be in the range of 80 to 190 µm, the $P_S$ (%) be in the range of 35.0 to 50.0%, the $P_L$ (%) be in the range of 2.0 to 5.0%, and the L, $P_S$, and $P_L$ satisfy the following formula (3).

$$71.1 \leq L \times P_S^2/(1000 \times P_L) \leq 80.1 \quad (3)$$

The glass fiber-reinforced resin molded article of the present embodiment is preferably used for a case of a portable electronic device such as a smartphone, a tablet, a laptop computer, and a mobile personal computer, and a part of a mother board, a frame, a speaker, an antenna, and the like.

Then, Examples and Comparative Examples of the present invention will be shown.

EXAMPLES

Example 1

In the present example, first, flat cross-sectional glass fiber in the amount of 30.0% by mass with respect to the total amount and polyetheretherketone (manufactured by Daicel Evonik Ltd., trade name: VESTAKEEP 2000G (described as PEEK in Table 1)) in the amount of 70.0% by mass with respect to the total amount were kneaded with a screw rotation speed of 100 rpm in a twin-screw kneader (manufactured by SHIBAURA MACHINE CO., LTD., trade name: TEM-26SS) to thereby produce resin pellets. The flat cross-sectional glass fiber has the E glass composition, a minor axis of 5.5 µm, a major axis of 33.0 µm, and a major axis/minor axis of 6.0.

Then, the resin pellets obtained in the present example were used to conduct injection molding in an injection molding machine (manufactured by Nissei Plastic Industrial Co. Ltd., trade name: NEX80) at a mold temperature of 200° C. and an injection temperature of 410° C. to thereby produce a first glass fiber-reinforced resin molded article having a size of 80 mm in length×60 mm in width and a thickness of 2.0 mm, and a second glass fiber-reinforced resin molded article having a size of 100 mm in length×100 mm in width and a thickness of 1.5 mm.

Then, as for the first glass fiber-reinforced resin molded article produced in the present example, the TD direction shrinkage factor and the MD direction shrinkage factor were each measured, and the MD direction shrinkage factor/TD direction shrinkage factor (shrinkage ratio) was determined. In addition, the shrinkage ratio/reference shrinkage ratio was determined using the MD direction shrinkage factor/TD direction shrinkage factor of the first glass fiber-reinforced resin molded article in Reference Example 1 described below as the reference shrinkage ratio.

Then, as for the second glass fiber-reinforced resin molded article produced in the present example, the warpage occurred was measured and the warpage amount was determined. In addition, the warpage amount/reference warpage amount was determined using the warpage occurred in the second glass fiber-reinforced resin molded article of Reference Example 1 described below as the reference warpage amount.

Then, as for the first glass fiber-reinforced resin molded article produced in the present example, the number average fiber length L of the glass fiber having a length of 25 µm or more contained in the first glass fiber-reinforced resin molded article was calculated by the following method.

Then, as for the first glass fiber-reinforced resin molded article produced in the present example, the proportion $P_S$ of the glass fiber having a length in the range of 25 to 100 µm with respect to the total number of the glass fiber having a length of 25 µm or more contained in the first glass fiber-reinforced resin molded article and the proportion $P_L$ of the glass fiber having a length of 500 µm or more with respect to the total number of the glass fiber having a length of 25 µm or more contained in the first glass fiber-reinforced resin molded article were determined by the method described below.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 1.

[Number Average Fiber Length L of Glass Fiber Having Length of 25 µm or More Contained in First Glass Fiber-Reinforced Resin Molded Article]

First, the first glass fiber-reinforced resin molded article was heated in a muffle furnace at 650° C. for 0.5 to 24 hours to decompose the organic matter. Then, the remaining glass fiber was transferred to a glass petri dish, and the glass fiber was dispersed using acetone on the surface of the petri dish. Subsequently, the length of 1000 or more glass fiber dispersed on the petri dish surface was measured using a stereoscopic microscope, and an average of the length of the glass fiber having a length of 25 µm or more was taken to calculate the number average fiber length L of the glass fiber having a length of 25 µm or more.

[Proportion $P_S$ of Glass Fiber Having Length in Range of 25 to 100 µm with Respect to Total Number of Glass Fiber Having Length of 25 µm or More Contained in First Glass Fiber-Reinforced Resin Molded Article]

First, the glass fiber-reinforced resin molded article was heated in a muffle furnace at 650° C. in the range of 0.5 to 24 hours to decompose the organic matter. Then, the remaining glass fiber was transferred to a glass petri dish, and the glass material was dispersed using acetone on the surface of the petri dish. Subsequently, the length of 1000 or more glass fiber dispersed on the petri dish surface was measured using a stereoscopic microscope, and the total number of the glass fiber having a length of 25 µm or more and the number of the glass fiber having a length of 25 to 100 µm (object to be counted) were counted. Then, ((the number of the glass fiber having a length of 25 to 100 µm)/(the total number of the glass fiber having a length of 25 µm or more))×100 was calculated to determine the proportion $P_S$ of the glass fiber having a length in the range of 25 to 100 µm with respect to the total number of the glass fiber having a length of 25 µm or more.

[Proportion $P_L$ of Glass Fiber Having Length of 500 µm or More with Respect to Total Number of Glass Fiber Having a Length of 25 µm or More Contained in First Glass Fiber-Reinforced Resin Molded Article]

First, the first glass fiber-reinforced resin molded article was heated in a muffle furnace at 650° C. in the range of 0.5 to 24 hours to decompose the organic matter. Then, the remaining glass fiber was transferred to a glass petri dish, and the glass material was dispersed using acetone on the surface of the petri dish. Subsequently, the length of 1000 or more glass fiber dispersed on the petri dish surface was measured using a stereoscopic microscope, and the total number of the glass fiber having a length of 25 µm or more and the number of the glass fiber having a length of 500 µm or more (object to be counted) were counted. Then, ((the number of the glass fiber having a length of 500 µm or more)/(the total number of the glass fiber having a length of 25 µm or more))×100 was calculated to determine the proportion $P_L$ of the glass fiber having a length of 500 µm or more with respect to the total number of the glass fiber having a length of 25 µm or more.

Example 2

In the present example, resin pellets were obtained in the entirely same manner as in Example 1, except that flat cross-sectional glass fiber in the amount of 40.0% by mass with respect to the total amount and polyetheretherketone (manufactured by Daicel Evonik Ltd., trade name: VESTA-KEEP 2000G) in the amount of 60.0% by mass with respect to the total amount were used.

Then, the first glass fiber-reinforced resin molded article and the second glass fiber-reinforced resin molded article were produced in the entirely same manner as in Example 1, except that the resin pellets obtained in the present example were used.

Then, as for the first glass fiber-reinforced resin molded article produced in the present example, the TD direction shrinkage factor, the MD direction shrinkage factor, the shrinkage ratio, the shrinkage ratio/reference shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article were determined in the entirely same manner as in Example 1.

Then, as for the second glass fiber-reinforced resin molded article produced in the present example, the warpage amount and the warpage amount/reference warpage amount were determined in the entirely same manner as in Example 1.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 1.

Example 3

In the present example, resin pellets were obtained in the entirely same manner as in Example 1, except that flat cross-sectional glass fiber in an amount of 20.0% by mass with respect to the total amount and polyetheretherketone (manufactured by Daicel Evonik Ltd., trade name: VESTA-KEEP 2000G) in an amount of 80.0% by mass with respect to the total amount were used.

Then, the first glass fiber-reinforced resin molded article and the second glass fiber-reinforced resin molded article were produced in the entirely same manner as in Example 1, except that the resin pellets obtained in the present example were used.

Then, as for the first glass fiber-reinforced resin molded article produced in the present example, the TD direction shrinkage factor, the MD direction shrinkage factor, the shrinkage ratio, the shrinkage ratio/reference shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Example 1.

Then, as for the second glass fiber-reinforced resin molded article produced in the present example, the warpage amount and the warpage amount/reference warpage amount were determined in the entirely same manner as in Example 1.

Then, the value of $L \times P_S^2/(1000 \times P_L)$ was determined based on the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article. The results are shown in Table 1.

Comparative Example 1

In the present comparative example, resin pellets were obtained in the entirely same manner as in Example 1, except that flat cross-sectional glass fiber having the E glass composition, a minor axis of 7.0 μm, a major axis of 42.0 μm, and a major axis/minor axis of 6.0 was used as the flat cross-sectional glass fiber.

Then, the first glass fiber-reinforced resin molded article and the second glass fiber-reinforced resin molded article were produced in the entirely same manner as in Example 1, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Example 1.

Then, as for the second glass fiber-reinforced resin molded article produced in the present comparative example, the warpage amount and the warpage amount/reference warpage amount were determined in the entirely same manner as in Example 1.

Then, the value of $L \times P_S^2/(1000 \times P_L)$ was determined based on the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article. The results are shown in Table 1.

Comparative Example 2

In the present comparative example, resin pellets were obtained in the entirely same manner as in Example 1, except that flat cross-sectional glass fiber in an amount of 10.0% by mass with respect to the total amount and polyetheretherketone (manufactured by Daicel Evonik Ltd., trade name: VESTAKEEP 2000G) in an amount of 90.0% by mass with respect to the total amount were used.

Then, the first glass fiber-reinforced resin molded article and the second glass fiber-reinforced resin molded article were produced in the entirely same manner as in Example 1, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of m or more contained in the first glass fiber-reinforced resin molded article were determined in the entirely same manner as in Example 1.

Then, as for the second glass fiber-reinforced resin molded article produced in the present comparative example, the warpage amount and the warpage amount/ reference warpage amount were determined in the entirely same manner as in Example 1.

Then, the value of $L \times P_S^2/(1000 \times P_L)$ was determined based on the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article. The results are shown in Table 1.

Reference Example 1

In the present reference example, resin pellets were obtained in the entirely same manner as in Example 1, except that flat cross-sectional glass fiber having the E glass composition, a minor axis of 7.0 μm, a major axis of 28.0 μm, and a major axis/minor axis of 4.0 was used as the flat cross-sectional glass fiber.

Then, the first glass fiber-reinforced resin molded article and the second glass fiber-reinforced resin molded article were produced in the entirely same manner as in Example 1, except that the resin pellets obtained in the present reference example were used.

Then, as for the first glass fiber-reinforced resin molded article produced in the present reference example, the TD direction shrinkage factor, the MD direction shrinkage factor, the shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Example 1.

As for the second glass fiber-reinforced resin molded article produced in the present reference example, the warpage amount was determined in the entirely same manner as in Example 1. The results are shown in Table 1.

Comparative Example 3

In the present comparative example, first, flat cross-sectional glass fiber in the amount of 30.0% by mass with respect to the total amount and polybutylene terephthalate (manufactured by POLYPLASTICS CO., LTD., trade name: DURANEX 2000 (described as PBT in Table 2)) in an amount of 70.0% by mass with respect to the total amount were kneaded with a screw rotation speed of 110 rpm in a twin-screw kneader (manufactured by SHIBAURA MACHINE CO., LTD., trade name: TEM-26SS) to thereby obtain resin pellets. The flat cross-sectional glass fiber has the E glass composition, a minor axis of 5.5 μm, a major axis of 33.0 μm, and a major axis/minor axis of 6.0.

Then, the resin pellets obtained in the present comparative example were used to conduct injection molding in an injection molding machine (manufactured by Nissei Plastic Industrial Co. Ltd., trade name: NEX80) at a mold temperature of 90° C. and an injection temperature of 250° C. to thereby produce a first glass fiber-reinforced resin molded article having a size of 80 mm in length×60 mm in width and a thickness of 2.0 mm, and a second glass fiber-reinforced resin molded article having a size of 100 mm in length×100 mm in width and a thickness of 1.5 mm.

Then, as for the first glass fiber-reinforced resin molded article produced in the present comparative example, the TD direction shrinkage factor, the MD direction shrinkage factor, the shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Example 1.

Then, as for the second glass fiber-reinforced resin molded article produced in the present comparative example, the warpage amount was determined in the entirely same manner as in Example 1.

In addition, the shrinkage ratio/reference shrinkage ratio was determined using the MD direction shrinkage factor/TD direction shrinkage factor of the first glass fiber-reinforced resin molded article in Reference Example 2 described below as the reference shrinkage ratio, and the warpage amount/reference warpage amount was determined using the warpage occurred in the second glass fiber-reinforced resin molded article of Reference Example 2 described below as the reference warpage amount.

Then, the value of $L \times P_S^2/(1000 \times P_L)$ was determined based on the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article. The results are shown in Table 2.

Comparative Example 4

In the present comparative example, resin pellets were obtained in the entirely same manner as in Comparative Example 3, except that flat cross-sectional glass fiber having the E glass composition, a minor axis of 7.0 μm, a major axis of 42.0 μm, and a major axis/minor axis of 6.0 was used as the flat cross-sectional glass fiber and the screw rotation speed was 100 rpm.

Then, the first glass fiber-reinforced resin molded article and the second glass fiber-reinforced resin molded article were produced in the entirely same manner as in Comparative Example 3, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Comparative Example 3.

Then, as for the second glass fiber-reinforced resin molded article produced in the present comparative example, the warpage amount and the warpage amount/reference warpage amount were determined in the entirely same manner as in Comparative Example 3.

Then, the value of $L \times P_S^2/(1000 \times P_L)$ was determined based on the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 2.

Comparative Example 5

In the present comparative example, resin pellets were obtained in the entirely same manner as in Comparative Example 3, except that flat cross-sectional glass fiber having the E glass composition, a minor axis of 5.5 µm, a major axis of 33.0 µm, and a major axis/minor axis of 6.0 was used as the flat cross-sectional glass fiber and the screw rotation speed was 150 rpm.

Then, the first glass fiber-reinforced resin molded article and the second glass fiber-reinforced resin molded article were produced in the entirely same manner as in Comparative Example 3, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of m or more contained in the first glass fiber-reinforced resin molded article were determined in the entirely same manner as in Comparative Example 3.

Then, as for the second glass fiber-reinforced resin molded article produced in the present comparative example, the warpage amount and the warpage amount/reference warpage amount were determined in the entirely same manner as in Comparative Example 3.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 2.

Reference Example 2

In the present reference example, resin pellets were obtained in the entirely same manner as in Comparative Example 3, except that flat cross-sectional glass fiber having the E glass composition, a minor axis of 7.0 µm, a major axis of 28.0 µm, and a major axis/minor axis of 4.0 was used as the flat cross-sectional glass fiber and the screw rotation speed was 100 rpm.

Then, the first glass fiber-reinforced resin molded article and the second glass fiber-reinforced resin molded article were produced in the entirely same manner as in Comparative Example 3, except that the resin pellets obtained in the present reference example were used.

Then, as for the first glass fiber-reinforced resin molded article produced in the present reference example, the TD direction shrinkage factor, the MD direction shrinkage factor, the shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article were determined in the entirely same manner as in Example 1.

As for the second glass fiber-reinforced resin molded article produced in the present reference example, the warpage amount was determined in the entirely same manner as in Example 1. The results are shown in Table 2.

Comparative Example 6

In the present comparative example, first, flat cross-sectional glass fiber in the amount of 30.0% by mass with respect to the total amount and polycarbonate (manufactured by TEJIN LIMITED., trade name: Panlite L1250Y (described as PC in Table 3)) in the amount of 70.0% by mass with respect to the total amount were kneaded with a screw rotation speed of 110 rpm in a twin-screw kneader (manufactured by SHIBAURA MACHINE CO., LTD., trade name: TEM-26SS) to thereby produce resin pellets. The flat cross-sectional glass fiber has the E glass composition, a minor axis of 5.5 µm, a major axis of 33.0 µm, and a major axis/minor axis of 6.0.

Then, the resin pellets obtained in the present comparative example were used to conduct injection molding in an injection molding apparatus (manufactured by Nissei Plastic Industrial Co. Ltd., trade name: NEX80) at a mold temperature of 120° C. and an injection temperature of 300° C. to thereby produce a first glass fiber-reinforced resin molded article having a size of 80 mm in length×60 mm in width and a thickness of 2.0 mm, and a second glass fiber-reinforced resin molded article having a size of 100 mm in length×100 mm in width and a thickness of 1.5 mm.

Then, as for the first glass fiber-reinforced resin molded article produced in the present comparative example, the TD direction shrinkage factor, the MD direction shrinkage factor, the shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article were determined in the entirely same manner as in Example 1.

Then, as for the second glass fiber-reinforced resin molded article produced in the present comparative example, the warpage amount was determined in the entirely same manner as in Example 1.

In addition, the shrinkage ratio/reference shrinkage ratio was determined using the MD direction shrinkage factor/TD direction shrinkage factor of the first glass fiber-reinforced resin molded article in Reference Example 3 described below as the reference shrinkage ratio, and the warpage amount/reference warpage amount was determined using the warpage occurred in the second glass fiber-reinforced resin molded article of Reference Example 3 described below as the reference warpage amount.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 3.

Comparative Example 7

In the present comparative example, resin pellets were obtained in the entirely same manner as in Comparative Example 6, except that flat cross-sectional glass fiber having the E glass composition, a minor axis of 7.0 µm, a major axis of 42.0 µm, and a major axis/minor axis of 6.0 was used as the flat cross-sectional glass fiber and the screw rotation speed was 100 rpm.

Then, the first glass fiber-reinforced resin molded article and the second glass fiber-reinforced resin molded article were produced in the entirely same manner as in Comparative Example 6, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of m or more contained in the first glass fiber-reinforced resin molded article were determined in the entirely same manner as in Comparative Example 6.

Then, as for the second glass fiber-reinforced resin molded article produced in the present comparative example, the warpage amount and the warpage amount/reference warpage amount were determined in the entirely same manner as in Comparative Example 6.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 3.

Comparative Example 8

In the present comparative example, resin pellets were obtained in the entirely same manner as in Comparative Example 6, except that flat cross-sectional glass fiber having the E glass composition, a minor axis of 5.5 µm, a major axis of 33.0 µm, and a major axis/minor axis of 6.0 was used as the flat cross-sectional glass fiber and the screw rotation speed was 150 rpm.

Then, the first glass fiber-reinforced resin molded article and the second glass fiber-reinforced resin molded article were produced in the entirely same manner as in Comparative Example 6, except that the resin pellets obtained in the present comparative example were used.

Then, as for the first glass fiber-reinforced resin molded article produced in the present comparative example, the TD direction shrinkage factor, the MD direction shrinkage factor, the shrinkage ratio, the shrinkage ratio/reference shrinkage ratio, the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article were determined in the entirely same manner as in Comparative Example 6.

Then, as for the second glass fiber-reinforced resin molded article produced in the present comparative example, the warpage amount and the warpage amount/reference warpage amount were determined in the entirely same manner as in Comparative Example 6.

Then, the value of $L \times P_S^2/(1000 \times P_L)$ was determined based on the number average fiber length L of the glass fiber having a length of 25 µm or more contained in the first glass fiber-reinforced resin molded article, the proportion $P_S$ of the glass fiber having a length in the range of 25 to 100 µm with respect to the total number of the glass fiber having a length of 25 µm or more contained in the first glass fiber-reinforced resin molded article, and the proportion $P_L$ of the glass fiber having a length of 500 µm or more with respect to the total number of the glass reinforcing material having a length of 25 µm or more contained in the first glass fiber-reinforced resin molded article. The results are shown in Table 3.

Reference Example 3

In the present reference example, resin pellets were obtained in the entirely same manner as in Comparative Example 6, except that flat cross-sectional glass fiber having the E glass composition, a minor axis of 7.0 µm, a major axis of 28.0 µm, and a major axis/minor axis of 4.0 was used as the flat cross-sectional glass fiber and the screw rotation speed was 100 rpm.

Then, the first glass fiber-reinforced resin molded article and the second glass fiber-reinforced resin molded article were produced in the entirely same manner as in Comparative Example 6, except that the resin pellets obtained in the present reference example were used.

Then, as for the first glass fiber-reinforced resin molded article produced in the present reference example, the TD direction shrinkage factor, the MD direction shrinkage factor, the shrinkage ratio, the number average fiber length L of the glass fiber having a length of 25 μm or more contained in the first glass fiber-reinforced resin molded article, the proportion $P_S$ of the glass fiber having a length in the range of 25 to 100 μm with respect to the total number of the glass fiber having a length of 25 μm or more contained in the first glass fiber-reinforced resin molded article, and the proportion $P_L$ of the glass fiber having a length of 500 μm or more with respect to the total number of the glass reinforcing material having a length of 25 μm or more contained in the first glass fiber-reinforced resin molded article were determined in the entirely same manner as in Example 1.

As for the second glass fiber-reinforced resin molded article produced in the present reference example, the warpage amount was determined in the entirely same manner as in Example 1. The results are shown in Table 3.

TABLE 1

|  |  | Example 1 | Example 2 | Example 3 | Comparative Example 1 | Comparative Example 2 | Reference Example 1 |
|---|---|---|---|---|---|---|---|
| Thermoplastic resin | Type | PEEK | PEEK | PEEK | PEEK | PEEK | PEEK |
|  | Content in glass fiber-reinforced resin molded article (% by mass) | 70.0 | 60.0 | 80.0 | 70.0 | 90.0 | 70.0 |
| (Flat cross-sectional) glass fiber | Minor axis (μm) | 5.5 | 5.5 | 5.5 | 7.0 | 5.5 | 7.0 |
|  | Major axis (μm) | 33.0 | 33.0 | 33.0 | 42.0 | 33.0 | 28.0 |
|  | Major axis/minor axis | 6.0 | 6.0 | 6.0 | 6.0 | 6.0 | 4.0 |
|  | Content in glass fiber-reinforced resin molded article (% by mass) | 30.0 | 40.0 | 20.0 | 30.0 | 10.0 | 30.0 |
| Proportion PS (%) of glass fiber having length of 25 to 100 μm with respect to total number of glass fiber having length of 25 μm or more | | 39.0 | 45.0 | 32.0 | 51.0 | 28.0 | 28.0 |
| Proportion PL (%) of glass fiber having length of 500 μm or more with respect to total number of glass fiber having length of 25 μm or more | | 3.5 | 2.5 | 5.5 | 4.0 | 7.0 | 5.0 |
| Number average fiber length L (μm) of glass fiber having length of 25 μm or more | | 150 | 95 | 250 | 135 | 290 | 250 |
| $L \times P_S^2/(1000 \times P_L)$ | | 65.2 | 77.0 | 46.5 | 87.8 | 32.5 | — |
| TD direction shrinkage factor (%) | | 0.69 | 0.59 | 0.80 | 0.72 | 0.80 | 0.80 |
| MD direction shrinkage factor (%) | | 0.53 | 0.50 | 0.56 | 0.52 | 0.56 | 0.51 |
| Shrinkage ratio (MD direction shrinkage factor/TD direction shrinkage factor) | | 0.77 | 0.85 | 0.70 | 0.72 | 0.70 | 0.64 |
| Shrinkage ratio/reference shrinkage ratio | | 1.20 | 1.33 | 1.10 | 1.13 | 1.10 | — |
| Warpage amount (mm) | | 1.5 | 1.0 | 2.0 | 3.0 | 3.6 | 4.0 |
| warpage amount/reference warpage amount | | 0.38 | 0.25 | 0.50 | 0.75 | 0.90 | — |

TABLE 2

|  |  | Comparative Example 3 | Comparative Example 4 | Comparative Example 5 | Reference Example 2 |
|---|---|---|---|---|---|
| Thermoplastic resin | Type | PBT | PBT | PBT | PBT |
|  | Content in glass fiber-reinforced resin molded article (% by mass) | 70.0 | 70.0 | 70.0 | 70.0 |
| (Flat cross-sectional) glass fiber | Minor axis (μm) | 5.5 | 7.0 | 5.5 | 7.0 |
|  | Major axis (μm) | 33.0 | 42.0 | 33.0 | 28.0 |
|  | Major axis/minor axis | 6.0 | 6.0 | 6.0 | 4.0 |
|  | Content in glass fiber-reinforced resin molded article (% by mass) | 30.0 | 30.0 | 30.0 | 30.0 |
| Proportion PS (%) of glass fiber having length of 25 to 100 μm with respect to total number of glass fiber having length of 25 μm or more | | 37.0 | 40.0 | 42.0 | 20.0 |
| Proportion PL (%) of glass fiber having length of 500 μm or more with respect to total number of glass fiber having length of 25 μm or more | | 7.4 | 15.0 | 4.0 | 22.4 |
| Number average fiber length L (μm) of glass fiber having length of 25 μm or more | | 255 | 295 | 210 | 380 |
| $L \times P_S^2/(1000 \times P_L)$ | | 47.2 | 31.5 | 92.6 | — |
| TD direction shrinkage factor (%) | | 0.93 | 0.93 | 0.92 | 1.00 |
| MD direction shrinkage factor (%) | | 0.47 | 0.48 | 0.47 | 0.48 |
| Shrinkage ratio (MD direction shrinkage factor/TD direction shrinkage factor) | | 0.51 | 0.52 | 0.51 | 0.48 |
| Shrinkage ratio/reference shrinkage ratio | | 1.05 | 1.08 | 1.06 | — |
| Warpage amount (mm) | | 4.0 | 3.5 | 4.0 | 4.5 |
| warpage amount/reference warpage amount | | 0.89 | 0.78 | 0.89 | — |

TABLE 3

|  |  | Comparative Example 6 | Comparative Example 7 | Comparative Example 8 | Reference Example 3 |
|---|---|---|---|---|---|
| Thermoplastic resin | Type | PC | PC | PC | PC |
|  | Content in glass fiber-reinforced resin molded article (% by mass) | 70.0 | 70.0 | 70.0 | 70.0 |
| (Flat cross-sectional) glass fiber | Minor axis (μm) | 5.5 | 7.0 | 5.5 | 7.0 |
|  | Major axis (μm) | 33.0 | 42.0 | 33.0 | 28.0 |
|  | Major axis/minor axis | 6.0 | 6.0 | 6.0 | 4.0 |
|  | Content in glass fiber-reinforced resin molded article (% by mass) | 30.0 | 30.0 | 30.0 | 30.0 |
| Proportion PS (%) of glass fiber having length of 25 to 100 μm with respect to total number of glass fiber having length of 25 μm or more |  | 40.0 | 45.0 | 50.0 | 23.0 |
| Proportion PL (%) of glass fiber having length of 500 μm or more with respect to total number of glass fiber having length of 25 μm or more |  | 9.8 | 6.7 | 5.0 | 17.8 |
| Number average fiber length L (μm) of glass fiber having length of 25 μm or more |  | 190 | 170 | 170 | 270 |
| L × $P_S^2$/(1000 × $P_L$) |  | 31.0 | 51.4 | 85.0 | — |
| TD direction shrinkage factor (%) |  | 0.30 | 0.30 | 0.29 | 0.38 |
| MD direction shrinkage factor (%) |  | 0.17 | 0.17 | 0.18 | 0.17 |
| Shrinkage ratio (MD direction shrinkage factor/TD direction shrinkage factor) |  | 0.57 | 0.57 | 0.62 | 0.45 |
| Shrinkage ratio/reference shrinkage ratio |  | 1.27 | 1.27 | 1.39 | — |
| Warpage amount (mm) |  | 0.5 | 0.5 | 0.5 | 0.7 |
| warpage amount/reference warpage amount |  | 0.71 | 0.71 | 0.71 | — |

As shown in Table 1, according to the glass fiber-reinforced resin molded articles of Examples 1 to 3 in which the thermoplastic resin is polyaryletherketone and the value of L×$P_S^2$/(1000×$P_L$) is in the range of 39.5 to 82.4, it is demonstrated that the value of the shrinkage ratio/reference shrinkage ratio is 1.05 or more and thus the anisotropy of the shrinkage factor can be reduced, and the warpage amount/reference warpage amount is 0.50 or less and thus the occurrence of warpage can be significantly reduced.

On the other hand, as shown in Table 1, according to the glass fiber-reinforced resin molded article of Comparative Example 1 or Comparative Example 2 in which the thermoplastic resin is polyaryletherketone and the value of L×$P_S^2$/(1000×$P_L$) is less than 39.5 or more than 82.4, it is demonstrated that, although the anisotropy of the shrinkage factor can be reduced, the warpage amount/reference warpage amount is 0.75 or more and thus the occurrence of warpage cannot be reduced.

As seen in Tables 2 and 3, it is demonstrated that, when the thermoplastic resin is not polyaryletherketone, the anisotropy of the shrinkage factor can be reduced, but the warpage amount/reference warpage amount is 0.71 or more and thus the occurrence of warpage cannot be reduced, regardless of the value of L×$P_S^2$/(1000×$P_L$).

The invention claimed is:

1. A glass fiber-reinforced resin molded article comprising:
 a glass fiber portion in a range of 15.0 to 50.0% by mass with respect to the total amount of the glass fiber-reinforced resin molded article; and
 a polyaryletherketone thermoplastic resin, wherein
 the glass fiber portion consists of:
  glass fiber having a flat cross-sectional shape having a major axis in a range of 29.5 to 55.0 μm and a ratio of the major axis to a minor axis (major axis/minor axis) in a range of 5.0 to 10.0,
  the glass fiber having a length of 25 μm or more, and the glass fiber comprises a composition including:
   $SiO_2$ in a range of 52.0 to 56.0% by mass,
   $Al_2O_3$ in a range of 12.0 to 16.0% by mass,
   MgO and CaO in a range of 20.0 to 25.0% by mass in total, and
   $B_2O_3$ in a range of 5.0 to 10.0% by mass, with respect to a total amount of the glass fiber,
  a number average fiber length L (μm) of the glass fiber having a length of 25 μm or more contained in the glass fiber-reinforced resin molded article is in a range of 50 to 300 μm;
  a proportion $P_S$ (%) of the glass fiber having a length in a range of 25 to 100 μm with respect to the total number of the glass fiber having a length of 25 μm or more contained in the glass fiber-reinforced resin molded article is in a range of 20.0 to 60.0%;
  a proportion $P_L$ (%) of the glass fiber having a length of 500 μm or more with respect to the total number of the glass fiber having a length of 25 μm or more contained in the glass fiber-reinforced resin molded article is in a range of 1.0 to 15.0%; and
  the L (μm), $P_S$ (%), and $P_L$ (%) satisfy a following formula (1):

$$39.5 \leq L \times P_S^2/(1000 \times P_L) \leq 82.4 \quad (1).$$

2. The glass fiber-reinforced resin molded article according to claim 1, wherein the L (μm) is in a range of 75 to 250 μm, the $P_S$ (%) is in a range of 30.0 to 50.0%, the $P_L$ (%) is in a range of 2.0 to 6.0%, and the L, $P_S$, and $P_L$ satisfy a following formula (2):

$$55.9 \leq L \times P_S^2/(1000 \times P_L) \leq 81.9 \quad (2).$$

3. The glass fiber-reinforced resin molded article according to claim 1, wherein the L (μm) is in a range of 80 to 190 μm, the $P_S$ (%) is in a range of 35.0 to 50.0%, the $P_L$ (%) is in a range of 2.0 to 5.0%, and the L, $P_S$, and $P_L$ satisfy the following formula (3):

$$71.1 \leq L \times P_S^2/(1000 \times P_L) \leq 80.1 \quad (3).$$

* * * * *